(12) United States Patent
Hegde et al.

(10) Patent No.: US 8,798,150 B2
(45) Date of Patent: Aug. 5, 2014

(54) BI-DIRECTIONAL VIDEO COMPRESSION FOR REAL-TIME VIDEO STREAMS DURING TRANSPORT IN A PACKET SWITCHED NETWORK

(75) Inventors: Harsha Hegde, Hawthorn Woods, IL (US); Tarun Agarwal, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 1308 days.

(21) Appl. No.: 12/328,790

(22) Filed: Dec. 5, 2008

(65) Prior Publication Data

US 2010/0142616 A1    Jun. 10, 2010

(51) Int. Cl.
| | |
|---|---|
| *H04N 7/26* | (2006.01) |
| *H04N 21/6437* | (2011.01) |
| *H04L 12/26* | (2006.01) |
| *H04L 29/06* | (2006.01) |

(52) U.S. Cl.
CPC ......... *H04N 19/00* (2013.01); *H04N 19/00206* (2013.01); *H04N 21/6437* (2013.01); *H04L 43/0852* (2013.01); *H04L 65/80* (2013.01)
USPC ............ 375/240.15; 375/240.02; 375/240.26; 709/224

(58) Field of Classification Search
CPC ................................ H04N 7/26; H04N 19/00
USPC ............... 375/240.15, 240.26; 370/230, 231, 370/395.21, 465, 466; 725/136
IPC ......................................................... H04N 7/26
See application file for complete search history.

(56) References Cited

U.S. PATENT DOCUMENTS

| | | | |
|---|---|---|---|
| 5,617,142 | A | 4/1997 | Hamilton |
| 6,434,197 | B1 | 8/2002 | Wang et al. |
| 6,560,282 | B2 | 5/2003 | Tahara et al. |
| 7,274,661 | B2 | 9/2007 | Harrell et al. |
| 7,274,740 | B2 | 9/2007 | van Beek et al. |
| 2005/0063391 | A1* | 3/2005 | Pedersen .................. 370/395.21 |
| 2008/0115185 | A1* | 5/2008 | Qiu et al. ...................... 725/118 |

\* cited by examiner

*Primary Examiner* — Jay Au Patel
*Assistant Examiner* — Neil Mikeska
(74) *Attorney, Agent, or Firm* — Fenwick & West LLP (57) ABSTRACT

A method, a system and a computer device for initiating bi-directional compression of a video stream in a packet switched network, based on delay tolerance of a service or application. A video frame recompression (VFR) utility determines an end-to-end (E2E) delay tolerance retrieved from a Real-time Transport Control Protocol (RTCP) report. The VFR utility then determines the actual expected delay based on a deep inspection of packet headers. The VFR utility utilizes a processing opportunity delay (which determines whether the E2E delay tolerance is greater than the actual expected delay) to reprocess video content comprising Intra-coded (I) pictures/frames and Predicted (P) frames to improve compression efficiency. The VFR utility may also utilize a complexity ratio which is a ratio of the I-Frame rate and the P-Frame rate to select frames for compression. The VFR utility recompresses video content by replacing P-Frames with B-Frames.

14 Claims, 6 Drawing Sheets

BI-DIRECTIONAL VIDEO COMPRESSION FOR REAL-TIME VIDEO STREAMS DURING TRANSPORT IN A PACKET SWITCHED NETWORK

BACKGROUND

1. Technical Field

The present invention generally relates to packet switched networks and in particular to bi-directional video compression in packet switched networks.

2. Description of the Related Art

In video compression formats, such as in the International Organization for Standardization/International Electro-technical Commission (ISO/IEC) Moving Picture Experts Group (MPEG) video standards, often only the differences between frames are encoded. For example, in a scene in which a person walks past a stationary background, only the moving region is required to be represented (either using motion compensation or as refreshed image data, or as a combination of the two, depending on which representation requires fewer bits to adequately represent the picture). The parts of the scene that are not changing need not be sent repeatedly. Pictures that are used as a reference for predicting other pictures are referred to as "reference pictures". The three major picture types found in typical video compression designs are Intra coded (I) pictures, Predicted (P) pictures, and Bi-predictive (B) pictures. They are also commonly referred to as I frames, P frames, and B frames. In such designs, the pictures that are coded without prediction from other pictures are called the "I" pictures. Pictures that use prediction from a single reference picture (or a single picture for prediction of each region) are called the "P" pictures. Pictures that use a prediction signal that is formed as a (possibly weighted) average of two reference pictures are called the "B" pictures.

In real-time video streams (such as video telephony, video conferencing and live video streams), the MPEG compression coders/decoders (codecs) are not able to look ahead to make coding decisions. This means that only Intracoded Video Object Plane (I-VOP)/I-frames and P-VOP/P-frames are used to encode the video sequences that use the lowest compression ratios. The B-VOP/B-frames that use bi-directional reference frame information and have the highest compression ratios are not used to make coding/compression decisions. B-VOP/B-frames cannot be used in real-time video transports without introducing delays at the point of video capture and coding/compression.

SUMMARY OF ILLUSTRATIVE EMBODIMENTS

Disclosed are a method, a system and a computer device for initiating bi-directional compression of a video stream in a packet switched network, based on delay tolerance of a service or application. A video frame recompression (VFR) utility determines an end-to-end (E2E) delay tolerance retrieved from a Real-time Transport Control Protocol (RTCP) report. The VFR utility then determines the actual expected delay based on a deep inspection of packet headers. The VFR utility utilizes a processing opportunity delay (which determines whether the E2E delay tolerance is greater than the actual expected delay) to reprocess video content comprising Intra-coded (I) pictures/frames and Predicted (P) frames to improve compression efficiency. The VFR utility may also utilize a complexity ratio, determined as a ratio of the I-Frame rate and the P-Frame rate, to select frames for compression. The VFR utility recompresses video content by replacing P-Frames with Bi-predictive (B-) Frames.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, a system and a computer device for initiating bi-directional compression of a video stream in a packet switched network, based on delay tolerance of a service or application. A video frame recompression (VFR) utility determines an end-to-end (E2E) delay tolerance retrieved from a Real-time Transport Control Protocol (RTCP) report. The VFR utility then determines the actual expected delay based on a deep inspection of packet headers. The VFR utility utilizes a processing opportunity delay (which determines whether the E2E delay tolerance is greater than the actual expected delay) to reprocess video content comprising Intra-coded (I) pictures/frames and Predicted (P) frames to improve compression efficiency. The VFR utility may also utilize a complexity ratio, determined as a ratio of the I-Frame rate and the P-Frame rate, to select frames for compression. The VFR utility recompresses video content by replacing P-Frames with Bi-predictive (B-) Frames.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
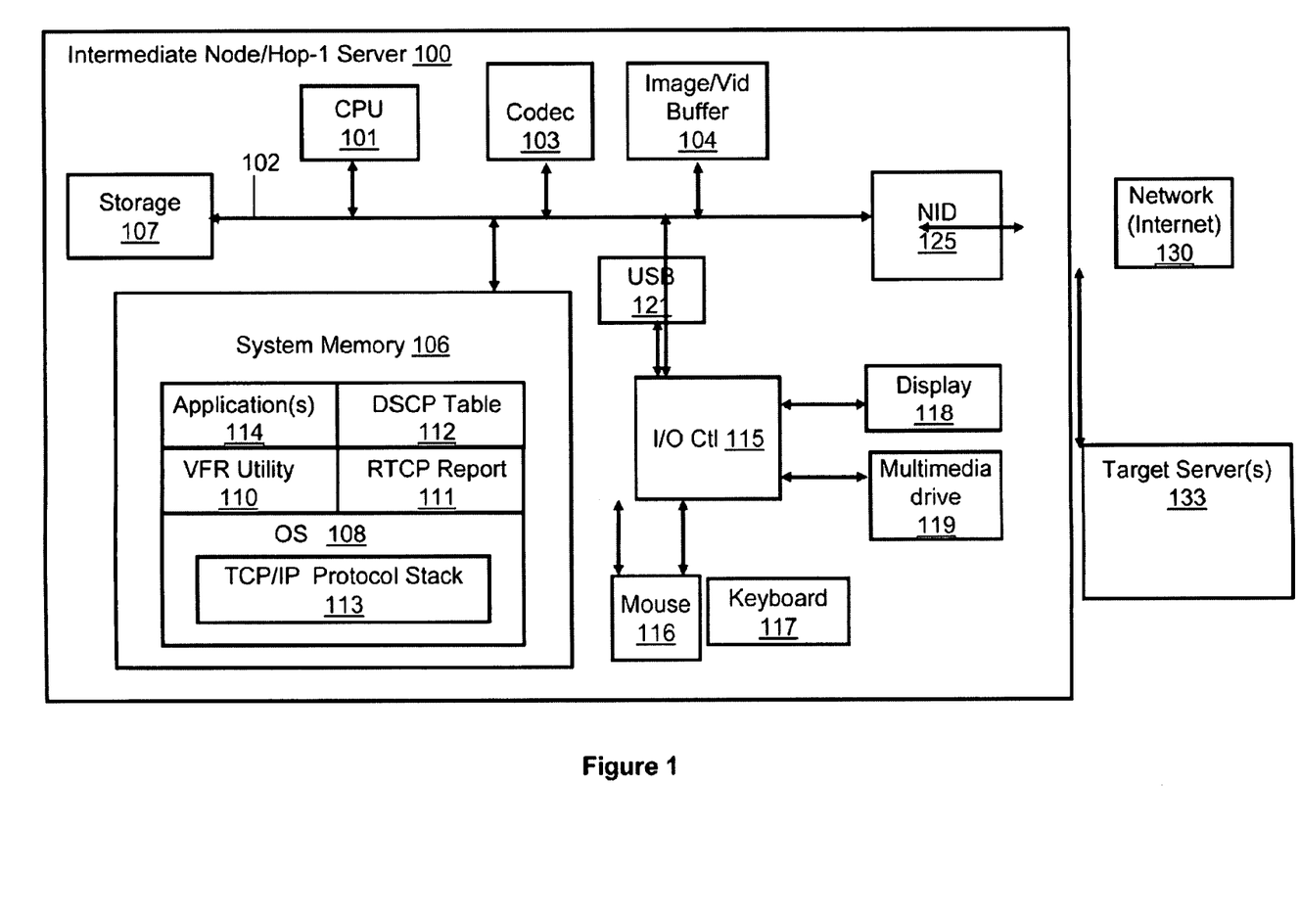
FIG. 1 provides a block diagram representation of an example data processing system within which the invention is practiced, according to one embodiment of the invention.

With reference now to the figures, and beginning with FIG. 1, there is depicted a block diagram representation of an example data processing system (DPS), utilized as a Hop-1 router/server, according to one embodiment. The functionality of the invention may be provided by different configurations of data processing systems/devices, including a personal computer, a Hop-1 router/server, a portable device, such as a personal digital assistant (PDA), a smart phone, and/or other types of electronic devices that may generally be considered processing devices. As illustrated and described herein, the data processing system is a Hop-1 Server, and the invention is described from the perspective of that device configuration. Hop-1 Server 100 comprises at least one processor or central processing units (CPUs) connected to system memory 106 via system interconnect/bus 102. Coder/Decoder (Codec) 103 and Video Buffer 104 are also connected to system bus 102. Also connected to system bus 102 is input/output (I/O) controller 115, which provides connectivity and control for input devices, of which pointing device (or mouse) 116 and keyboard 117 are illustrated. I/O controller 115 also provides connectivity and control for output devices, of which display 118 is illustrated. Additionally, a multimedia drive 119 (e.g., compact disk read/write (CDRW) or digital video disk (DVD) drive) and USB (universal serial bus) port 121 are illustrated, coupled to I/O controller 115. Multimedia drive 119 and USB port 121 enable insertion of a removable storage device (e.g., optical disk or "thumb" drive) on which data/instructions/code may be stored and/or from which data/instructions/code may be retrieved. Hop-1 Server 100 also comprises storage 107, within/from which data/instructions/code may also be stored/retrieved.

Hop-1 Server 100 is also illustrated with a network interface device (NID) 125, by which Hop-1 Server 100 may connect to one or more access/external networks 130, of which the Internet is provided as one example. In this implementation, the Internet represents/is a worldwide collection of networks and gateways that utilize the Transmission Control Protocol/Internet Protocol (TCP/IP) suite of protocols to communicate with one another. NID 125 may be configured to operate via wired or wireless connection to an access point of the network. Network 130 may be an external network such as the Internet or wide area network (WAN), or an internal network such as an Ethernet (local area network—LAN) or a Virtual Private Network (VPN). For example, network 130 may represent a packet switched network from which Hop-1 Server 100 receives a video stream. Connection to the external network 130 may be established with one or more servers 133, which may also provide data/instructions/code for execution on Hop-1 Server 100, in one embodiment.

In addition to the above described hardware components of Hop-1 Server 100, various features of the invention are completed/supported via software (or firmware) code or logic stored within memory 106 or other storage (e.g., storage 107) and executed by CPU 101. Thus, for example, illustrated within memory 106 are a number of software/firmware/logic components, including operating system (OS) 108 (e.g., Microsoft Windows®, a trademark of Microsoft Corp, or GNU®/Linux®, registered trademarks of the Free Software Foundation and The Linux Mark Institute), applications 114, Differentiated Services Code Point (DSCP) table 112, Real-time Transport Control Protocol (RTCP) report 111, Transmission Control Protocol/Internet Protocol (TCP/IP) Stack 113 within OS 108 and Video Frame Recompression (VFR) utility 110 (which executes on CPU 101). In actual implementation, VFR utility 110 is executed by CPU 101 which initiates the compression functions of codec 103. For simplicity, VFR utility 110 is illustrated and described as a stand alone or separate software/firmware component, which provides specific functions, as described below.

In one embodiment, servers 133 includes a software deploying server, and Hop-1 Server 100 communicates with the software deploying server (133) via network (e.g., Internet 130) using network interface device 125. Then, VFR utility 110 may be deployed from/on the network, via software deploying server 133. With this configuration, software deploying server performs all of the functions associated with the execution of VFR utility 110. Accordingly, Hop-1 Server 100 is not required to utilize internal computing resources of Hop-1 Server 100 to execute VFR utility 110.

CPU 101 executes VFR utility 110 as well as OS 108, which supports the user interface features of VFR utility 110. Certain functions supported and/or implemented by VFR utility are enabled by processing logic executed by processor and/or device hardware. For simplicity of the description, the collective body of code that enables these various functions is referred to herein as VFR utility 110. Among the software code/instructions/logic provided by VFR utility 110, and which are specific to the invention, are: (a) code/logic for detecting a real-time video flow, wherein the real-time video flow is a Real-time Transport Protocol (RTP) flow; (b) code/logic for obtaining a measure of an expected one way end to end (E2E) delay from a source of the video flow to a target of the video flow, based on feedback from a Real-time Transport Control Protocol (RTCP) report; (c) code/logic for evaluating a processing opportunity delay from a comparison of an estimated E2E delay to the target and the value of an optimal E2E delay for the video flow; and (d) code/logic for recompressing the content of video flow using Bi-predictive (B-) Frame insertion, in which Predicted (P-) Frames are replaced by B-Frames. According to the illustrative embodiment, when CPU 101 executes VFR utility 110, Hop-1 Server 100 initiates a series of functional processes that enable the above functional features as well as additional features/functionality. These features/functionality are described in greater detail below within the description of FIGS. 2-6.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the invention in general.

Figure 2:
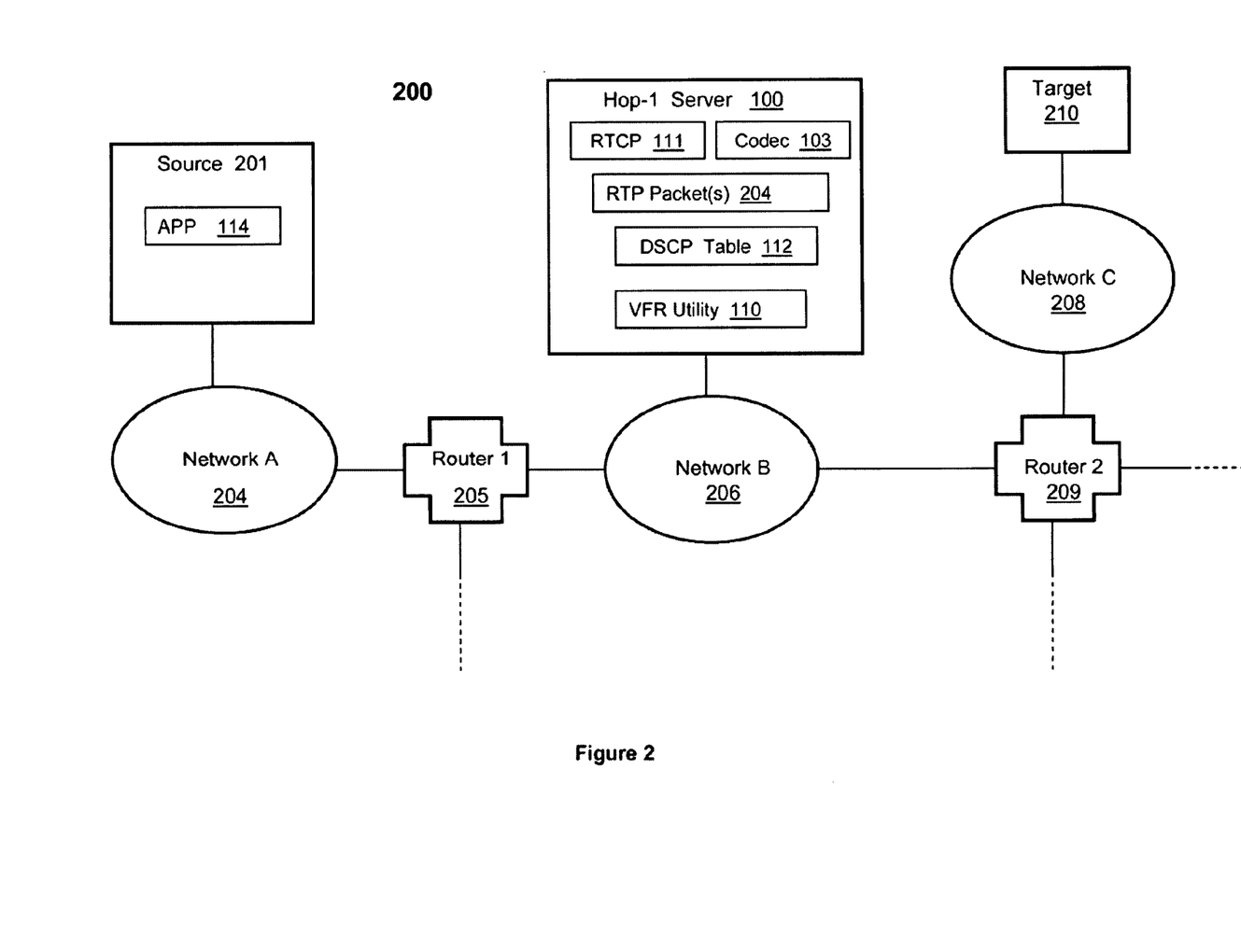
FIG. 2 illustrates an example packet switched network, in accordance with one embodiment of the invention.

With reference now to FIG. 2, an example packet switched network is illustrated, within which features of the invention may be implemented. Notably, the illustrative embodiments are described within a network that supports Real-time Transport Protocol (RTP), which defines a standardized packet format for delivering audio and video over the Internet. Thus, the references to a video flow within the described embodiments may also be referred to as a RTP flow.

Returning to FIG. 2, Network 200 comprises several sub-networks, including Network-A 204, Network-B 206, and Network-C 208. Network-A 204 is communicatively connected to Network-B 206 via router-1 205, and Network B is in turn communicatively connected to Network C 208 via router-2 209. Source device 201 is connected to Network-A 204, and Target device 210 is connected to Network-C 208. Source device 201 generates source data, which data are transmitted/routed to Target device 210 via the interconnected sub-networks and routers within Network 200. Network 200 is further configured with Hop-1 Server 100, which is an intermediate receiving node along the data transmission path. As shown, Hop-1 Server 100 is directly connected to Network-B 206. As further shown, Hop-1 Server 100 comprises DSCP table 112, RTCP report 111 and RTP packets 204. Hop-1 Server 100 further comprises Codec 103 and VFR utility 110.

Figure 5:
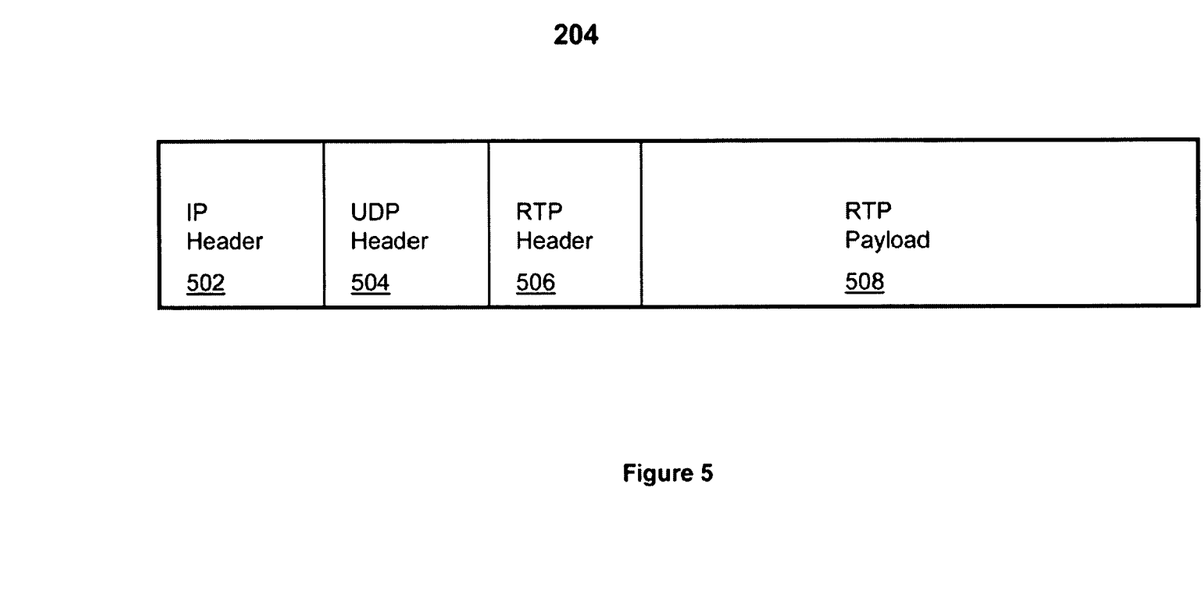
FIG. 5 illustrates a Real-time Transport Protocol (RTP) packet, according to one embodiment.

In Network 200, source device 201 executes application 114 and initiates a video flow of packet data to target 210. At Hop-1 Server 100, Video Frame Recompression (VFR) utility 110 detects receipt of an information signal transmitted via the packet data from source device 201. FIG. 5 (described below) illustrates an example RTP packet 204 with the informational signal. VFR utility 110 obtains a Differentiated Services Code Point (DSCP) packet classification value from a packet header of received RTP packets 204.

Differentiated Services or DiffServ is a coarse-grained, class-based mechanism for traffic management. DiffServ is a computer networking architecture that specifies a simple, scalable and coarse-grained mechanism for classifying, managing network traffic and providing Quality of Service (QoS) guarantees on modern IP networks. DiffServ can, for example, be used to provide low-latency, guaranteed service (GS) to critical network traffic such as voice or video while providing simple best-effort traffic guarantees to non-critical services such as web traffic or file transfers.

DiffServ relies on a mechanism to classify and mark packets as belonging to a specific class. DiffServ-aware routers and/or associated servers implement Per-Hop Behaviors (PHBs), which define the packet forwarding properties associated with a class of traffic. Different PHBs may be defined to offer, for example, low-loss, low-latency forwarding properties or best-effort forwarding properties. The Per-Hop Behavior (PHB) is indicated by encoding a 6-bit value, called the Differentiated Services Code Point (DSCP), into the 8-bit Differentiated Services (DS) field of the IP packet header.

Referring again to FIG. 2, upon detection of a video flow by the DSCP packet classification, VFR utility 110 retrieves a corresponding set of stored DSCP parameter values from DSCP table 112, including values for the following: (a) frame rate; (b) frame size; (c) optimal E2E delay; and (d) optimal end to end (E2E) jitter. In one embodiment, VFR utility 110 detects the video flow based on one or more of the DSCP packet classification, a Quality of Service Class Identifier (QCI) and RTP content-type. VFR utility 110 also monitors incoming packets for RTCP report(s) 111. Upon detection of RTCP report 111, VFR utility 110 retrieves information about the current (QoS) quality of service (from) E2E. In particular, VFR utility 110 obtains an expected E2E delay value which indicates the current quality of the service E2E. In one embodiment, VFR utility 110 may determine the expected E2E delay (i.e., a one way delay from source to target) from a round trip delay (RTD) parameter value in RTCP report 111.

In addition, VFR utility 110 may obtain a measure of jitter (associated with the video flow) from RTCP report 111.

In order to obtain an (average) actual delay to transport RTP packets 204 from source device 201 to intermediate/Hop-1 Server 100, VFR utility 110 initiates a deep inspection of RTP headers of RTP Packet(s) 204. The average actual delay from source device 201 to intermediate node (i.e., Hop-1 Server 100) is obtained from an interval defined by a set of initiating and receiving timestamps. From the deep inspection of RTP headers, VFR utility 110 may also retrieve one or more of: (a) an I-Frame rate; (b) a P-Frame rate; and (c) an overall frame rate. VFR utility 110 estimates a remaining delay to transport packets from Hop-1 Server 100 to target device 210 using the value of the expected E2E delay obtained from RTCP report 111. VFR utility 110 calculates an estimated E2E delay to the target based on (a) the actual delay from the source to target server 210 and (b) the remaining transport delay from the receiving node to the target. VFR utility 110 then compares the estimated E2E delay to the target with the optimal E2E delay obtained from DSCP table 112 (i.e., takes the difference of the estimated E2E delay and the optimal E2E delay) in order to obtain a processing opportunity delay. VFR utility 110 uses the opportunity delay to determine when video frames may be delayed and buffered.

In one embodiment, VFR utility 110 may select frames for (further) compression using one or more of: (a) the estimated remaining delay from the intermediate node (i.e., /Hop-1 Server 100) to target device 210; (b) the processing opportunity delay; and (c) source frame rates. VFR utility 110 may also utilize a video complexity ratio in order to select a number of frames to buffer and compress bi-directionally. Thus, VFR utility 110 monitors the complexity ratio which is obtained from a ratio of the I-Frame rate and the P-Frame rate.

In one embodiment, VFR utility 110 determines a whole number ratio (which measures a potential/likely number of frames for recompression) of (a) a first value represented by the processing opportunity delay and (b) a second value composed of one or more of: (a) an estimated remaining delay between the intermediate node (i.e., Hop-1 Server 100) and target device 210; and (b) an intermediate node processing delay (e.g., processing delay at Hop-1 Server 100). In particular, the second value may be obtained by taking the difference between (a) the estimated remaining delay between the intermediate node (Hop-1 Server 100) and target device 210; and (b) a node processing delay. When the whole number ratio (which indicates a number of frames which may be recompressed) has a value greater than or equal to "two" (2) (or other frame compression threshold value), VFR utility 110 selects a number of video frames for compression. VFR utility 110 initiates video frame bi-directional compression by replacing one or more P-frames with B-frames.

The following example enhances the discussion of initiating bi-directional compression based on delay tolerance. With this example, configured DSCP table 112 stored in Hop-1 Server 100 has an example row of parameters as follows:

DSCP=AF13; Size=QCIF; Rate=30 FPS; Optimal E2E Delay=500 ms; E2E Jitter=120 ms

VFR utility 110 retrieves example RTCP report 111 for the specific RTP flow with the following information:

One way E2E Delay=100 ms; One way Jitter=20 ms

After deep inspecting of an RTP header, VFR utility 110 retrieves an example average delay to an associated intermediate node (i.e., Hop-1 Server 100) from the source device 201 as follows:

Delay from Source=20 ms

VFR utility 110 estimates the delay from the associated intermediate node (i.e., Hop-1 Server 100) to target device 210 as follows:

Estimated Remaining delay=100 ms (which includes 20 ms processing delay at the intermediate node)

VFR utility 110 compares the total estimated E2E time (120 ms) to optimal E2E delay (time) from table (500 ms) and obtains a processing opportunity delay value/difference of 380 ms. The 380 ms difference is the estimated delay that intermediate node (Hop-1 Server 100) can intentionally introduce/utilize to further delay/buffer and compress video frames.

VFR utility 110 then calculates the number of frames to delay/buffer and compress as follows:

Frame count (ratio)=processing opportunity delay/estimated remaining delay discounted by node processing delay.

Thus, frame count ratio=(380 ms/80 ms) or average 4 frames. As a result, VFR utility 110 buffers and recompresses one or more video frames. VFR utility 110 then forwards the video flow including the compressed frames to target device 210.

Figure 3:
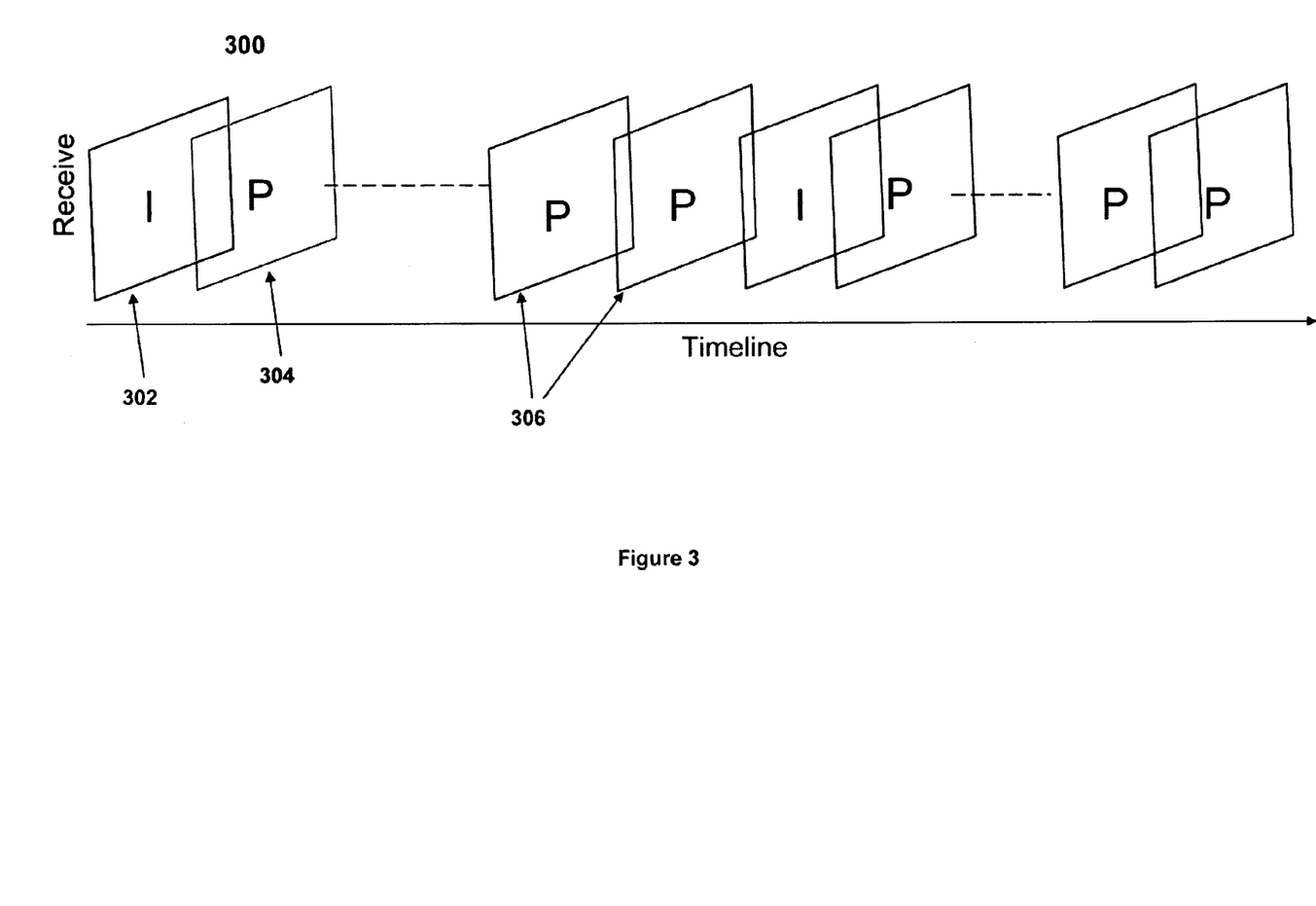
FIG. 3 illustrates video frames in a real time stream, according to one embodiment.

FIG. 3 illustrates video frames in a real time stream, according to one embodiment. Video flow 300 comprises a number of video frames including I-Frame 302, first P-Frame 304 and second set of P-Frames 306.

As previously described, the three major picture types found in typical video compression designs are Intra coded pictures, Predicted pictures, and Bi-predictive pictures. These picture types are also commonly referred to as I-frames, P-frames, and B-frames. The pictures/frames that are coded without prediction from other pictures are called the "I" pictures. Pictures that use prediction from a single reference picture (or a single picture for prediction of each region) are called the "P" pictures. Pictures that use a prediction signal that is formed as a (possibly weighted) average of two reference pictures are called the "B" pictures.

I-frames contain the video data for the entire frame of video and are typically placed every 10 to 15 frames. I-frames provide entry points into the file for random access, and are generally only moderately compressed. P-frames are encoded with reference to a past frame, i.e., a prior I-frame or P-frame. Thus P-frames only include changes relative to prior I or P frames. In general, P-frames receive a fairly high amount of compression and are used as references for future P-frames. Thus, both I and P frames are used as references for subsequent frames. Bi-directional pictures include the greatest amount of compression and require both a past and a future reference in order to be encoded. Bi-directional (B-) frames are never used as references for other frames.

In the example of FIG. 3, a source (e.g., Source device 201) initiates video flow 300 which illustrates a sequence of video frames that are routed towards target device 210 and are received by the intermediate node, Hop-1 Server 100. As indicated by the sequence comprising I-Frame 302, first P-Frame 304 and second set of P-Frames 306, video flow 300 is the output of a prior compression.

Figure 4:
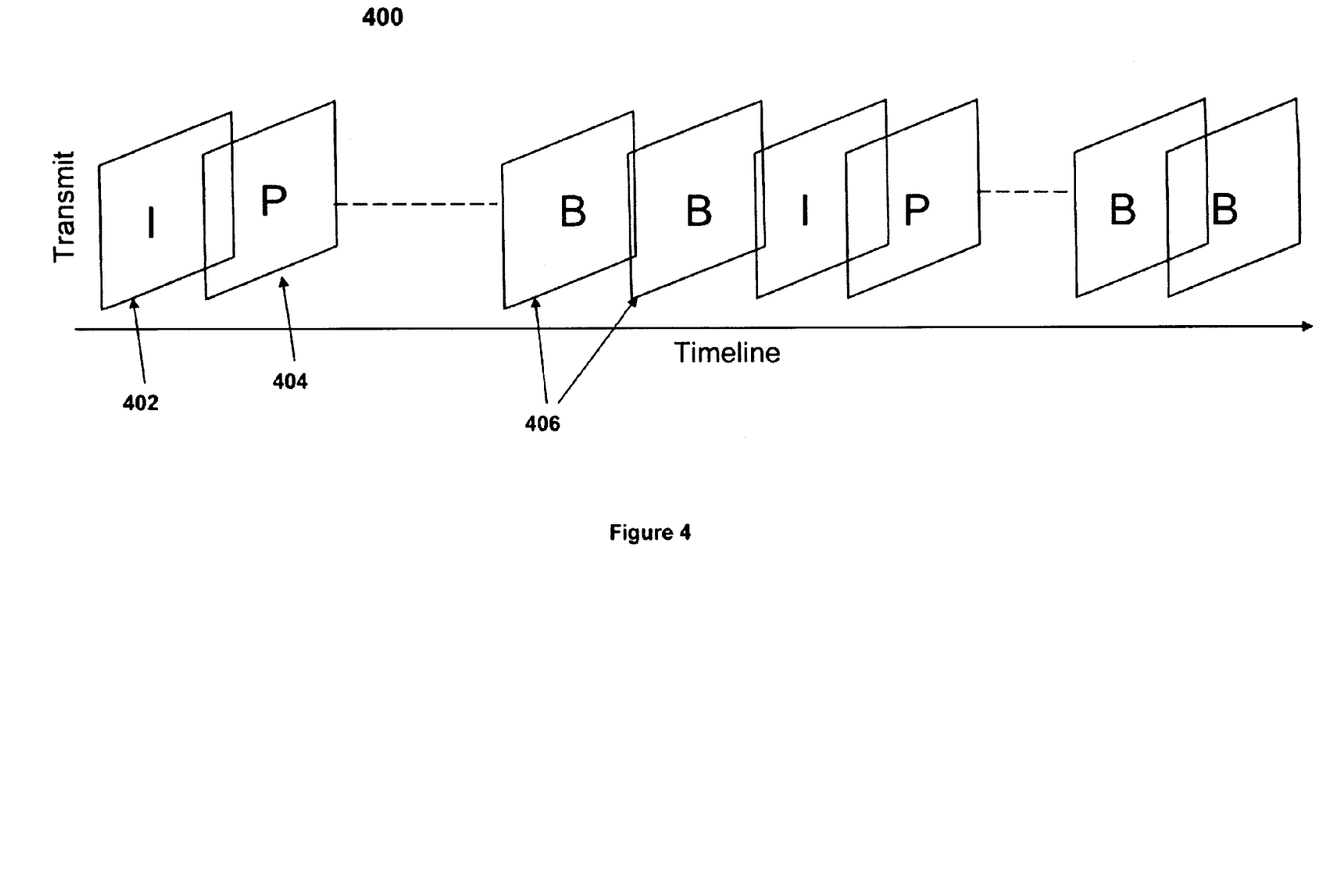
FIG. 4 illustrates video frames in a real time stream following bidirectional video compression, according to one embodiment.

FIG. 4 illustrates video frames in a real time stream following bidirectional video compression of video flow 300, according to one embodiment. Video flow 400 comprises a number of video frames including I-Frame 402, P-Frame 404 and B-Frames 406.

In FIG. 3, source device 201 initiates video flow 300 which provides an initial sequence of I and P frames prior to receipt (and recompression) by the intermediate node, Hop-1 Server 100. FIG. 4 illustrates a result of recompression following receipt (of video flow 300) and calculation of the frame count ratio and the processing opportunity delay (as described above) by the intermediate node, Hop-1 Server 100. Thus, Hop-1 Server 100 initiates bi-directional compression of a number of video frames of video flow 300 based on one or more of: (a) the processing opportunity delay; (b) the estimated E2E delay to the target; (c) a complexity ratio, wherein the complexity ratio is obtained from a ratio of a Intra-coded (I-) Frame rate and a Predicted (P-) Frame rate; and (d) an overall frame rate. VFR utility 110 executing within Hop-1 Server 100 triggers codec 103 to recompress the content of video flow 300. Codec 103 performs the recompression using B-Frame insertion, in which P-Frames are replaced by B-Frames to provide a greater degree of compression. B-Frames are pictures that use a prediction signal that is formed as a (possibly weighted) average of two reference pictures. Following recompression, video flow 400 is transmitted to target device 210.

FIG. 5 illustrates a Real-time Transport Protocol (RTP) packet, according to one embodiment. RTP packet 204 comprises multiple headers including Internet Protocol (IP) header 502, User Datagram Protocol (UDP) header 504 and RTP header 506. In addition, RTP packet 204 comprises RTP payload 508.

IP header 502 and UDP header 504 collectively facilitate the transfer of RTP packet 204 from source device 201 to target device 210 over an IP network. The Real-time Transport Protocol (RTP) defines a standardized packet format for delivering audio and video data (within RTP payload 508) over the Internet. When VFR utility 110 receives RTP packet 204 at the intermediate node (Hop-1 Server 100), VFR utility 110 obtains a Differentiated Services Code Point (DSCP) packet classification value from RTP packet header 506 of received RTP packet data 204. In one embodiment, VFR utility 110 detects the video flow based on one or more of the DSCP packet classification, a Quality of Service Class Identifier (QCI), and RTP content-type. As described above, VFR utility 110 also performs a deep inspection of RTP header(s) 506 to retrieve one or more of: (a) an I-Frame rate; (b) a P-Frame rate; and (c) an overall frame rate.

Figure 6:
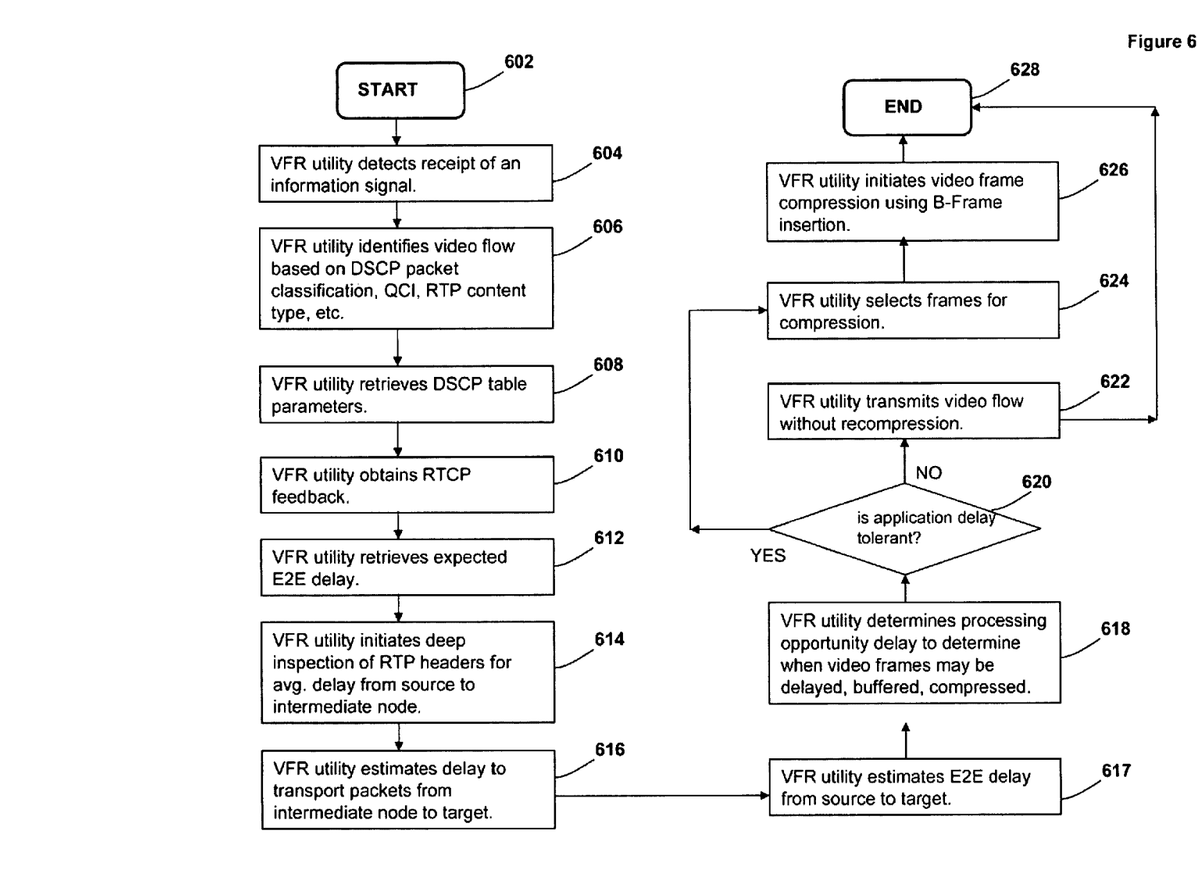
FIG. 6 is a flow chart illustrating the method for initiating bi-directional compression of a video stream in a packet switched network, based on delay tolerance of a service or application, according to one embodiment of the invention.

FIG. 6 is a flow chart illustrating the method by which the above processes of the illustrative embodiments are completed. In particular, FIG. 6 illustrates the method for initiating bi-directional compression of a video stream in a packet switched network, based on delay tolerance of a service or application (e.g., application 114) which initiates the video stream at source device 201. Although the method illustrated in FIG. 6 may be described with reference to components shown in FIGS. 1-5, it should be understood that this is merely for convenience and alternative components and/or configurations thereof can be employed when implementing the various methods. Key portions of the methods may be completed by VFR utility 110 executing on processor 101 within Hop-1 Server 100 (FIG. 1) and controlling specific operations of/on Hop-1 Server 100, and the methods are thus described from the perspective of either/both VFR utility 110 and Hop-1 Server 100.

The process of FIG. 6 begins at initiator block 602 and proceeds to block 604, at which VFR utility 110 detects receipt of an information signal. At block 606, VFR utility 110 identifies the information signal as video flow based on DSCP packet classification. In one embodiment, VFR utility 110 detects the video flow based on one or more of the DSCP packet classification, a Quality of Service Class Identifier (QCI) and RTP content-type. At block 608, VFR utility 110 retrieves DSCP table parameters, which include values for the following: (a) frame rate; (b) frame size; (c) optimal E2E delay; and (d) optimal end to end (E2E) jitter. VFR utility 110 also obtains RTCP feedback/report 111, as shown at block 610. At block 612, VFR utility 110 retrieves a measure of the expected E2E delay (from source to target) from RTCP report 111. VFR utility 110 initiates deep inspection of RTP headers in order to obtain average actual delay from source device 201 to the intermediate node (i.e., Hop-1 Server 100), as shown at block 614. The average actual delay from source device 201 to intermediate node (i.e., Hop-1 Server 100) is obtained by utilizing a set of initiating and receiving timestamps retrieved from the header of RTP packet(s) 204. From the deep inspection of RTP headers, VFR utility 110 may also retrieve one or more of: (a) an I-Frame rate; (b) a P-Frame rate; and (c) an overall frame rate.

VFR utility 110 estimates a remaining delay to transport packets from receiving/intermediate node to target device 210 using the value of the expected E2E delay obtained from RTCP report 111, as shown at block 616. VFR utility 110 calculates an estimated E2E delay to target device 210 based on (a) the actual delay from the source to the receiving node and (b) the remaining transport delay from the receiving/intermediate node to the target device 210, as shown at block 617.

At block 618, VFR utility 110 calculates the processing opportunity delay to determine when received video frames may be delayed, buffered and compressed. To obtain the processing opportunity delay, VFR utility 110 compares the estimated E2E delay to the target device 210 with the optimal E2E delay obtained from DSCP table 112 (i.e., VFR utility 110 takes the difference of the estimated E2E delay and the optimal E2E delay).

At decision block 620, VFR utility 110 determines whether source application 114 is delay tolerant (e.g., to allow frame recompression). In one embodiment, VFR utility 110 measures delay tolerance by factoring one or more of: (a) the processing opportunity delay; (b) the estimated remaining delay between the intermediate node, Hop-1 Server 100, and target device 210; (c) a complexity ratio, wherein the complexity ratio is obtained from a ratio of a Intra-coded (I-) Frame rate and a Predicted (P-) Frame rate; and (d) an overall frame rate. If, at block 620, VFR utility 110 determines that source application 114 is not delay tolerant, VFR utility 110 transmits the video flow without recompression, as shown at block 622. If, at block 620, VFR utility 110 determines that source application 114 is delay tolerant, VFR utility 110 selects frames for bidirectional compression, as shown at block 624. At block 626, VFR utility 110 initiates video frame compression (via codec 103) by replacing one or more P-frames with B-frames. According to one embodiment, VFR utility 110 completes video frame compression without compromising quality and delay budgets. The process ends at block 628.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer device. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system."

An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a packet switched network, a method of video compression comprising:
    detecting a real-time flow containing multiple frames;
    receiving a sequence of frames from the real-time flow, wherein the real-time flow is received and re-transmitted as a stream of data packets;
    retrieving one or more of (a) a differentiated services code point packet classification, (b) a quality of service class identifier and (c) a real-time transport protocol content-type parameter, from one or more packet headers of received data packets;
    determining whether the real-time flow is a real-time transport protocol video flow based on one or more of the differentiated services code point packet classification, the quality of service class identifier and the real-time transport protocol content-type parameter;
    retrieving stored differentiated services code point parameter values corresponding to the real-time flow, comprising parameter values for frame size, optimal end-to-end delay and optimal end-to-end jitter;
    obtaining a value of an expected one way end-to-end delay from a source of the real-time flow to a target of the real-time flow, wherein the value is retrieved from a real-time transport control protocol report;

calculating an estimated end-to-end delay to the target based on an actual delay from the source to a receiving node and an estimated remaining transport delay from the receiving node to the target;

evaluating a processing opportunity delay by comparing the estimated end-to-end delay to the target with the value for optimal end-to-end delay for the real-time flow;

initiating bi-directional compression of one or more frames of the real-time flow based on one or more of (a) the processing opportunity delay, (b) the estimated remaining transport delay to the target, (c) a complexity ratio that is obtained from a ratio of an intra-coded frame rate and a predicted frame rate, and (d) an overall frame rate; and when the real-time flow is re-compressed, forwarding the real-time flow with inserted bi-predictive frames to a target.

2. The method of claim 1, wherein the initiating further comprises:

calculating a whole number value of a frame count ratio of (a) the processing opportunity delay and (b) the estimated remaining transport delay to the target, discounted by a node processing delay;

determining a number of frames to buffer and compress bi-directionally based on one or more of the whole number value of the frame count ratio, the processing opportunity delay, the estimated remaining delay to the target discounted by the node processing delay, the complexity ratio, the intra-coded frame rate, the predicted frame rate and the overall frame rate; and when one of a number of frames available for compression is greater than a frame compression threshold value and the number of frames is at least equal to two (2), recompressing content of the real-time flow using bi-predictive frame insertion, in which predicted frames are replaced by bi-predictive frames;

wherein the compression is performed using a coder/decoder device.

3. The method of claim 1, wherein the calculating further comprises:

determining an actual delay to transport content of the real-time flow from the source to the receiving node;

estimating the remaining transport delay from the receiving node to the target using the value of the expected one way end-to-end delay obtained from the real-time transport control protocol report; and calculating the estimated end-to-end delay to the target based on an addition of the actual delay to transport content of the real-time flow from the source to the receiving node and the remaining transport delay from the receiving node to the target.

4. The method of claim 3, wherein the determining an actual delay further comprises:

performing a deep inspection of real-time transport protocol headers;

wherein the actual delay to transport content of the video flow from the source to the receiving node is obtained as an average of a plurality of actual delays to transport content of the video flow from the source to the receiving node; and wherein the deep inspection of real-time transport protocol headers further provides one or more rate types associated with the source from among the intra-coded frame rate, the predicted frame rate and the overall frame rate.

5. The method of claim 1, wherein the obtaining further comprises:

monitoring the real-time flow for a real-time transport control protocol report packet; and in response to detection of the real-time transport control protocol report packet, retrieving values for one or more of an expected one way delay and an expected one way jitter;

wherein, when the real-time transport control protocol report packet is detected, the real-time flow is a real-time transport protocol flow.

6. The method of claim 1, further comprising:

storing values for differentiated services code point parameters, comprising values for the frame size, the optimal end-to-end delay and the optimal end-to-end jitter.

7. A data processing system comprising:

a processor;

a memory coupled to the processor;

a network interface device coupled to the memory;

a coder/decoder coupled to the memory;

a utility which when executed on the processor enables the data processing system to perform the functions of:

detecting a real-time flow containing multiple frames;

receiving a sequence of frames from the real-time flow, wherein the real-time flow is received and re-transmitted as a stream of data packets;

retrieving one or more of (a) a differentiated services code point packet classification, (b) a quality of service class identifier and (c) a real-time transport protocol content-type parameter, from one or more packet headers of received data packets;

determining whether the real-time flow is a real-time transport protocol video flow based on one or more of the differentiated services code point packet classification, the quality of service class identifier and the real-time transport protocol content-type parameter;

retrieving stored differentiated services code point parameter values corresponding to the real-time flow, comprising parameter values for frame size, optimal end-to-end delay and optimal end-to-end jitter;

obtaining a value of an expected one way end-to-end delay from a source of the real-time flow to a target of the real-time flow, wherein the value is retrieved from a real-time transport control protocol report;

calculating an estimated end-to-end delay to the target based on an actual delay from the source to a receiving node and an estimated remaining transport delay from the receiving node to the target;

evaluating a processing opportunity delay by comparing the estimated end-to-end delay to the target with the value for optimal end-to-end delay for the real-time flow;

initiating bi-directional compression of one or more frames of the real-time flow based on one or more of (a) the processing opportunity delay, (b) the estimated remaining transport delay to the target, (c) a complexity ratio that is obtained from a ratio of the intra-coded frame rate and the predicted frame rate, and (d) an overall frame rate; and when the real-time flow is re-compressed, forwarding the real-time flow with inserted bi-predictive frames to a target.

8. The data processing system of claim 7, wherein the functions for initiating further comprises functions for:
calculating a whole number value of a frame count ratio of (a) the processing opportunity delay and (b) the estimated remaining transport delay to the target, discounted by a node processing delay;
determining a number of frames to buffer and compress bi-directionally based on one or more of a whole number value of the frame count ratio, the processing opportunity delay, the estimated remaining delay to the target discounted by the node processing delay, the complexity ratio, the intra-coded frame rate, the predicted frame rate and the overall frame rate; and
when one of a number of frames available for compression is greater than a frame compression threshold value and the number of frames is at least equal to two (2), recompressing content of the real-time flow using bi-predictive frame insertion, in which predicted frames are replaced by bi-predictive frames;
wherein the compression is performed using a coder/decoder device.

9. The data processing system of claim 7, wherein the functions for calculating further comprises functions for:
determining the actual delay to transport content of the video flow from the source to the receiving node via a deep inspection of real-time transport protocol headers;
wherein the actual delay to transport content of the video flow from the source to the receiving node is obtained from an average of a plurality of actual delays to transport content of the video flow from the source to the receiving node;
wherein the deep inspection of real-time transport protocol headers further provides one or more rate types associated with the source from among the intra-coded frame rate, the predicted frame rate and the overall frame rate;
estimating the remaining transport delay from the receiving node to the target using the value of the expected one way end-to-end delay obtained from the real-time transport control protocol report; and
calculating the estimated end-to-end delay to the target based on an addition of the actual delay to transport content of the video flow from the source to the receiving node and the remaining transport delay from the receiving node to the target.

10. The data processing system of claim 7, wherein the functions for obtaining further comprises functions for:
monitoring the video flow for a real-time transport control protocol report packet; and
in response to detection of the real-time transport control protocol report, retrieving values for one or more of an expected one way delay and an expected one way jitter.

11. A network server comprising:
a processor;
a computer readable medium coupled to the processor; and
program code on the computer readable medium that when executed by the processor provides the functionality of:
detecting a real-time flow containing multiple frames;
receiving a sequence of frames from the real-time video flow, wherein the video flow is received and re-transmitted as a stream of data packets;
retrieving one or more of (a) a differentiated services code point packet classification, (b) a quality of service class identifier and (c) a real-time transport protocol content-type parameter, from one or more packet headers of received data packets; and
determining whether the real-time flow is an real-time transport protocol video flow based on one or more of the differentiated services code point packet classification, the quality of service class identifier and the real-time transport protocol content-type parameter;
retrieving stored differentiated services code point parameter values corresponding to the real-time flow, comprising parameter values for frame size, optimal end-to-end delay and optimal end-to-end jitter;
obtaining a value of an expected one way end-to-end delay from a source of the real-time flow to a target of the real-time flow, wherein the value is retrieved from a real-time transport control protocol report;
calculating an estimated end-to-end delay to the target based on an actual delay from the source to a receiving node and an estimated remaining transport delay from the receiving node to the target;
evaluating a processing opportunity delay by comparing the estimated end-to-end delay to the target with the value for optimal end-to-end delay for the real-time flow;
initiating bi-directional compression of one or more frames of the real-time flow based on one or more of (a) the processing opportunity delay, (b) the estimated remaining transport delay to the target, (c) a complexity ratio that is obtained from a ratio of the intra-coded frame rate and the predicted frame rate, and (d) an overall frame rate and
when the real-time flow is re-compressed, forwarding the real-time flow with inserted bi-predictive frames to a target.

12. The network server of claim 11, wherein the program code for initiating further comprises program code for:
calculating a whole number value of a frame count ratio of (a) the processing opportunity delay and (b) the estimated remaining transport delay to the target, discounted by a node processing delay;
determining a number of frames to buffer and compress bi-directionally based on one or more of a whole number value of the frame count ratio, the processing opportunity delay, the estimated remaining delay to the target discounted by the node processing delay, the complexity ratio, the intra-coded frame rate, the predicted frame rate and the overall frame rate; and
when one of a number of frames available for compression is greater than a frame compression threshold value and the number of frames is at least equal to two (2), recompressing content of the real-time flow using bi-predictive frame insertion, in which predicted frames are replaced by bi-predictive frames;
wherein the compression is performed using a coder/decoder device.

13. The network server of claim 11, wherein the program code for calculating further comprises program code for:
determining the actual delay to transport content of the video flow from the source to the receiving node by using a deep inspection of real-time transport protocol headers;
wherein the actual delay to transport content of the video flow from the source to the receiving node is obtained from an average of a plurality of actual delays to transport content of the video flow from the source to the receiving node;
wherein the deep inspection of real-time transport protocol headers further provides one or more rate types associated with the source from among the intra-coded frame rate, the predicted frame rate and the overall frame rate;
estimating the remaining transport delay from the receiving node to the target using the value of the expected one way end-to-end delay obtained from the real-time transport control protocol report; and calculating the estimated end-to-end delay to the target based on an addition of the actual delay to transport content of the video flow from the source to the receiving node and the remaining transport delay from the receiving node to the target.

14. The network server of claim 11, wherein the program code for obtaining further comprises program code for:

monitoring the video flow for a real-time transport control protocol report packet; and in response to detection of the real-time transport control protocol report, retrieving values for one or more of an expected one way delay and an expected one way jitter.

* * * * *